US008412391B2

(12) United States Patent
Paluszek et al.

(10) Patent No.: US 8,412,391 B2
(45) Date of Patent: Apr. 2, 2013

(54) PROXIMITY SPACECRAFT MANEUVERING

(75) Inventors: Michael A. Paluszek, Princeton, NJ (US); Pradeep Bhatta, Plainsboro, NJ (US)

(73) Assignee: Princeton Satelitte Systems, Plainsboro, NJ (US)

(*) Notice: Subject to any disclaimer, the term of this patent is extended or adjusted under 35 U.S.C. 154(b) by 1124 days.

(21) Appl. No.: 12/193,172

(22) Filed: Aug. 18, 2008

(65) Prior Publication Data

US 2009/0132105 A1  May 21, 2009

Related U.S. Application Data

(60) Provisional application No. 60/956,414, filed on Aug. 17, 2007.

(51) Int. Cl.
*B64G 1/26* (2006.01)

(52) U.S. Cl. .......... 701/13; 701/533; 244/164; 244/165; 244/169; 244/172.4; 244/172.5

(58) Field of Classification Search .................... 701/13, 701/220, 226, 533; 244/164, 165, 169, 172.4, 244/172.5
See application file for complete search history.

(56) References Cited

U.S. PATENT DOCUMENTS

| | | | |
|---|---|---|---|
| 1,835,018 A | 12/1931 | Darrieus | |
| 4,162,410 A | 7/1979 | Amick | |
| 4,247,253 A | 1/1981 | Seki et al. | |
| 4,500,257 A | 2/1985 | Sullivan | |
| 4,657,211 A * | 4/1987 | Fuldner et al. | 244/172.5 |
| 5,109,345 A * | 4/1992 | Dabney et al. | 701/3 |
| 5,130,931 A * | 7/1992 | Paluszek et al. | 701/13 |
| 5,201,833 A * | 4/1993 | Goodzeit et al. | 244/165 |
| 5,248,118 A * | 9/1993 | Cohen et al. | 244/164 |
| 5,375,324 A | 12/1994 | Wallace et al. | |
| 5,493,392 A * | 2/1996 | Blackmon et al. | 356/139.03 |
| 5,503,525 A | 4/1996 | Brown et al. | |
| 5,676,524 A | 10/1997 | Lukas | |
| 5,734,736 A * | 3/1998 | Palmer et al. | 382/103 |
| 5,943,476 A * | 8/1999 | Dougherty et al. | 700/259 |
| 6,017,000 A * | 1/2000 | Scott | 244/158.6 |
| 6,072,433 A * | 6/2000 | Young et al. | 342/386 |
| 6,102,958 A | 8/2000 | Meystel et al. | |
| 6,275,751 B1 * | 8/2001 | Stallard et al. | 701/13 |
| 6,464,174 B1 * | 10/2002 | Turner | 244/158.6 |
| 6,688,842 B2 | 2/2004 | Boatner | |
| 6,843,446 B2 * | 1/2005 | Scott | 244/10 |
| 6,866,232 B1 * | 3/2005 | Finney | 244/172.4 |
| 6,942,454 B2 | 9/2005 | Ohlmann | |

(Continued)

FOREIGN PATENT DOCUMENTS

EP  1505370 A1  9/2005

*Primary Examiner* — Thomas Black
*Assistant Examiner* — Wae Louie
(74) *Attorney, Agent, or Firm* — Fox Rothschild LLP; Richard C. Woodbridge; Ryan Miller

(57) ABSTRACT

Provided is a method and system for maneuvering a first spacecraft relative to a nearby second spacecraft that occupies a finite volume of space including obstacles in the vicinity of the second from a measured present relative position to a desired ending relative position. A trajectory is computed for the first spacecraft from the present relative position to the ending relative position using the A* algorithm. One or more thrusters of the first spacecraft are then fired. The first spacecraft's relative position and velocity are then measured and compared to the computed trajectory.

15 Claims, 2 Drawing Sheets

U.S. PATENT DOCUMENTS

| | | | |
|---|---|---|---|
| 7,104,505 B2 * | 9/2006 | Tchoryk et al. | 244/172.4 |
| 7,118,075 B2 * | 10/2006 | Schubert | 244/169 |
| 7,142,981 B2 | 11/2006 | Hablani | |
| 7,189,050 B2 | 3/2007 | Taylor et al. | |
| 7,216,033 B2 * | 5/2007 | Flann et al. | 701/533 |
| 7,293,743 B2 * | 11/2007 | Cepollina et al. | 244/172.5 |
| 7,328,104 B2 * | 2/2008 | Overstreet et al. | 701/472 |
| 7,410,130 B2 * | 8/2008 | Wang et al. | 244/164 |
| 7,665,695 B2 * | 2/2010 | Wang et al. | 244/164 |
| 7,860,617 B1 * | 12/2010 | Gaylor et al. | 701/13 |
| 7,962,321 B2 * | 6/2011 | de Kleer | 703/14 |
| 8,006,937 B1 * | 8/2011 | Romano et al. | 244/172.4 |
| 8,234,234 B2 | 7/2012 | Shearer | |
| 2009/0132105 A1 * | 5/2009 | Paluszek et al. | 701/13 |

* cited by examiner

PROXIMITY SPACECRAFT MANEUVERING

CROSS REFERENCE TO RELATED APPLICATIONS

This application claims the benefit of U.S. Provisional Patent Application No. 60/956,414, filed Aug. 17, 2007, which is hereby incorporated herein by reference.

STATEMENT REGARDING FEDERALLY SPONSORED RESEARCH OR DEVELOPMENT

This invention was made with Government support under Contract No. NAS8-03030 awarded by the National Aeronautics and Space Administration. The Government has certain rights in the invention.

FIELD OF THE INVENTION

The present invention generally relates to maneuvering a spacecraft, and, more particularly, to maneuvering a spacecraft near other spacecraft.

BACKGROUND OF THE INVENTION

Maneuvering spacecraft in the vicinity of other objects is a complex operation, especially when the objective is to rendezvous with another, target object in a docking mission. Most of the algorithms developed to control a space craft in such circumstances have serious drawbacks.

Most of the existing methods and systems do not, for instance, optimize the fuel cost of the maneuver, or minimize the time taken to perform the maneuver. Moreover, they cannot, in general, deal with having unanticipated additional objects in the vicinity. Nor can they deal with stayout zones that have to be avoided that may result from, for instance, the optical sensors on the target. Most of the existing methods cannot be used to orbit the target en-route to a rendezvous, which may be desired in order to inspect either the spacecraft or the target. The few algorithms that can deal with obstacles and stay out zones tend to be very computationally intensive, requiring offline calculation. They are, therefore, of limited use, especially if obstacles near the target change during the maneuver. This may happen, for example, if the target encounters unexpected additional targets.

Several methods have been developed for use by spacecraft for close maneuvering, rendezvous and docking missions. Four of these are discussed below.

Method 1. The glideslope algorithm is a popular method of approaching another spacecraft. In this method the range rate is kept proportional to the range. When the range is zero the range rate is zero. The initial range rate/range ratio can be any desired. This algorithm cannot deal with stayout zones or obstacles, thus these must be handled in an ad hoc fashion. In addition, it does not allow for orbiting the target.

Method 2. Another method is the rbar or vbar approach. Vbar is the axis along the velocity vector and rbar is the axis along the position vector to the Earth. Approaches are made along either of these axes. However, this method also does not account for stayout zones or obstacles. As with the glideslope algorithm, this method does not handle orbiting the target.

Method 3. A method developed by Miller that can handle trajectory constraints such as obstacles and stayout zones is parametric programming and model predictive control, which finds the optimal control inputs as a piecewise affine function of the states. Most computation is performed off-line thus reducing the on-line computation to a simple table lookup. The solution found off-line is an exact solution, the equivalent of solving an open-loop optimal control problem over a finite horizon at each time step. However, even though the computation is offline it still must be done on the flight processor. In addition, obstacles may change during the approach which means this computationally intensive procedure must in practice be done in real-time.

Method 4. Another method developed by Zhao and Yang employs a 4-dimensional search space with 3 spatial and 1 temporal coordinate. Obstacles and potential conflicts are represented by several basic shapes and linear combinations of these shapes. Mathematical conditions are developed for a given point as well as a trajectory segment between two points to be outside of an obstacle. The A* search technique is used to obtain trajectory solutions in which successor trajectory points are selected that both avoid obstacles and satisfy dynamic motion constraints of the vehicle. A linear combination of flight distance and time is optimized. This algorithm is able to generate flight trajectories rapidly and has the potential to be used in real-time. However, the used of simple geometric shapes as the basis for obstacles is a major limitation of this approach. In addition it has no provision for non-uniform node spacing and generation.

SUMMARY OF THE INVENTION

This invention provides a new maneuvering method and system which allows a spacecraft to maneuver around any obstacles near or part of another spacecraft while minimizing a combination of consumption of fuel and duration of maneuvering time.

An aspect of the present invention provides a method and system of maneuvering a first spacecraft relative to a nearby second spacecraft that occupies a finite volume of space including obstacles in the vicinity of the second from a measured present relative position to a desired ending relative position. A trajectory is computed for the first spacecraft from the present relative position to the ending relative position using the A* algorithm, minimizing the amount of fuel to be used and the amount of time to complete the trajectory. Next one or more thrusters of the first spacecraft are fired to move the first spacecraft according to the computed trajectory. Then, after waiting for a predetermined length of time, the present relative position and velocity of the first spacecraft is measured and compared with the computed trajectory. If the first spacecraft has arrived at the desired relative position, the end condition is reached. Otherwise, if the first spacecraft is within a predetermined deviation from the computed trajectory, the waiting, measuring and comparing steps are repeated. Otherwise, the computing, firing, waiting, measuring and comparing steps are repeated.

In one aspect of the invention, the predetermined length of time before measuring the position and velocity of the first spacecraft is less than 2 seconds. In another, it is less than 1 second.

In another aspect of the invention, the predetermined deviation from the computed trajectory is a maximum position deviation value and a maximum velocity deviation value, and both values are proportional to the actual distance between the first spacecraft and the second spacecraft.

In another aspect of the invention, the maximum position deviation value is initially set at an operator defined value and declines to an operator defined tolerance and a maximum velocity deviation value is set to a second operator defined value and declines to a second operator defined tolerance.

In another aspect of the invention, the second spacecraft is also maneuvering, and the computing and measuring steps adjust for the maneuvering of the second spacecraft.

These and other features of the invention will be more fully understood by references to the following drawings.

DETAILED DESCRIPTION

Figure 1:
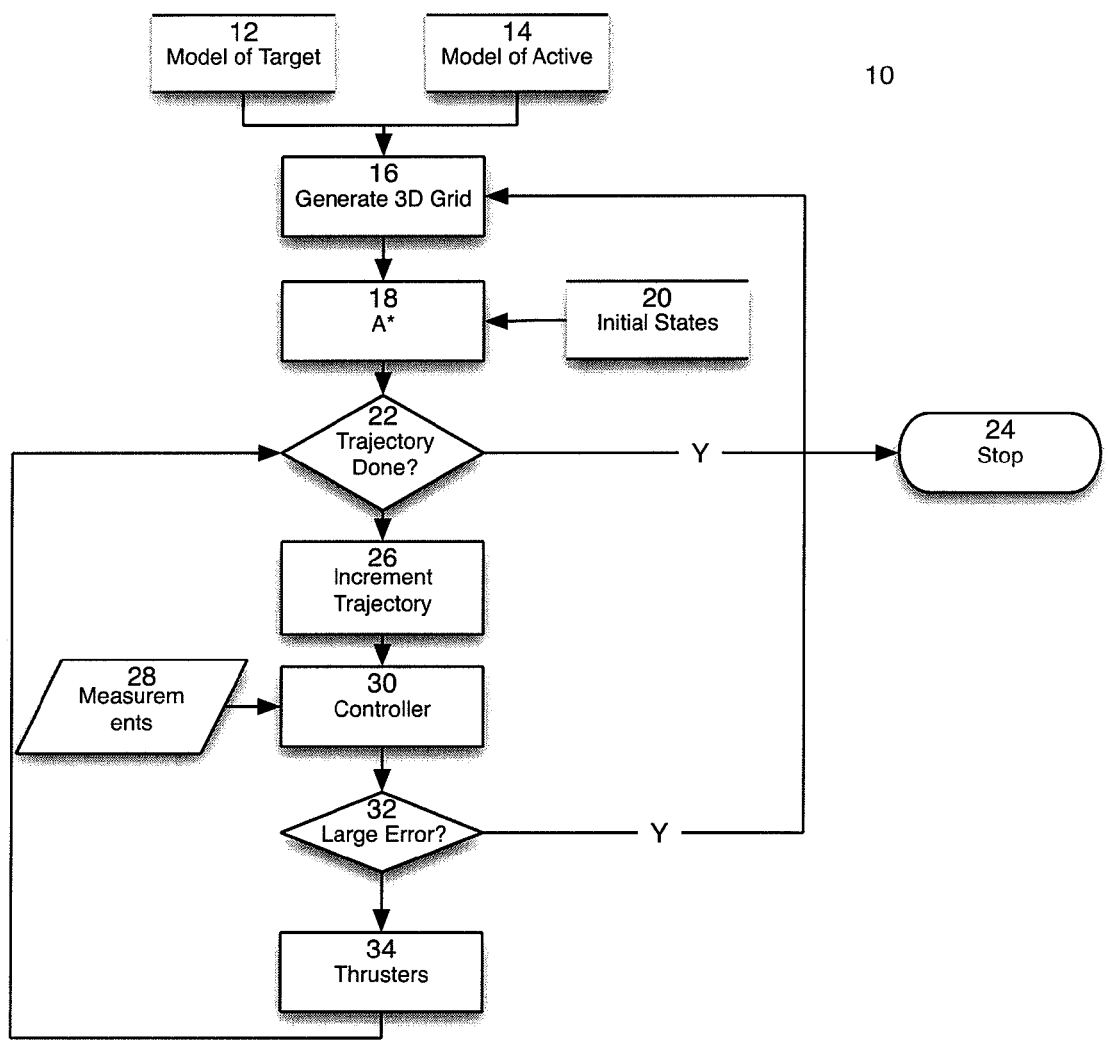
FIG. 1 shows a flow chart of the subject spacecraft maneuvering algorithm.

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

As used herein, the terms "computer" or "computer system" refers to any computer device having at least a processor, associated memory, and one or more input device, without limitation.

The present invention advantageously provides significant advantages. Unlike the methods 1, 2 and 4 discussed above, it advantageously can handle any obstacles or stayout zones, and these can change dynamically. Unlike method 3 it advantageously can handle dynamical situations and can be executed in real-time. In addition, unlike 4 it is advantageously designed to create grids that fit closely to the target geometry with additional nodes inserted around barriers and in narrow corridors.

The method and system for close maneuvering of spacecraft of this invention is particularly useful for rendezvous and docking missions.

The general mechanics of such maneuvers has been described in, for instance, U.S. Pat. No. 6,866,232 issued to Finney on Mar. 15, 2005 entitled "Automated docking of space vehicle", and U.S. Pat. No. 7,142,981 issued to Hablani on Nov. 28, 2006 entitled "Laser range finder closed-loop pointing technology of relative navigation, attitude determination, pointing and tracking for spacecraft rendezvous", the entire contents of both of which are hereby incorporated by reference.

The method and system of this invention make innovative use of the A* Algorithm. The A* Algorithm is well-known and numerous descriptions of it are available from readily accessible online sources, such as Wikipedia.com. The brief description herein is intended to provide some information, not to be an exhaustive reference to the A* Algorithm. Generally, A* incrementally searches all routes leading from the starting point until it finds the shortest path to a goal. Like all informed search algorithms, it searches first the routes that appear to be most likely to lead towards the goal. What sets A* apart from a greedy best-first search is that it also takes the distance already traveled into account, not merely calculating the local cost from the previously expanded node.

The A* Algorithm traverses various paths from start to goal. For each node traversed, it computes 3 values: G score—g(n)—the actual shortest distance traveled from source to current node, H score—h(n)—estimated (or "heuristic") distance from current node to goal, and F score—f(n)—sum of G score and H score. Starting with a given node, the algorithm expands the node with the lowest f(n) score—the node that has the lowest cost-per-benefit. A* maintains a set of partial solutions-unexpanded leaf nodes of expanded nodes-stored in a priority queue. The priority assigned to a path n is determined by a f(n)=g(n)–h(n). The function continues until a goal has a lower f(n) score than any node in the queue (or until the tree is fully traversed). Multiple goals may be passed over if there is a path that may lead to a lower-cost goal.

The A* Algorithm has been in use for many years for path planning for computer games, robotics and other applications. As described above, A* is an algorithm that searches in a state space for the least costly path from a start state to a goal state by examining the neighboring or adjacent states of the current state. A* maintains two lists of states called open and closed for unexamined and examined states. At the start closed is empty and open has only the starting state. In each iteration, the algorithm removes the most promising state from open for examination. If the state is not a goal then the neighboring locations are sorted. If they are new they are placed in open. If they are already in open the information about the states is updated if this is a cheaper path to those states. States that are already in closed are ignored. If open becomes empty before the goal state is reached then there is no solution. The most promising state in open is the location with the lowest cost path through that location. This heuristic search ranks each node by an estimate of the best route that goes through that node. The typical formula may be expressed as:

$$f(n)=g(n)-h(n) \qquad (i)$$

where f(n) is the score assigned to node n, g(n) is the actual cheapest cost of arriving at n from the start h(n) is the heuristic estimate of the cost to the goal from n. It combines the tracking of the previous path length of Dijkstra's algorithm, with the heuristic estimate of the remaining path from best-first search. A* is guaranteed to find the shortest path, as long as the heuristic estimate, h(n), is admissible—that is, it is never greater than the true remaining distance to the goal. It makes the most efficient use of the heuristic function so no search that uses the same heuristic function h(n) and finds optimal paths will expand fewer nodes than A*.

A preferred embodiment of the invention will now be described in detail by reference to the accompanying drawings in which, as far as possible, like elements are designated by like numbers.

A preferred embodiment of the invention, 10, is shown in FIG. 1.

Block 12 provides a 3-dimensional (3D) model of the target spacecraft, in the form of a vertex mesh. A vertex mesh consists of vertices that define the surface of the model. Each vertex is defined as an x, y and z point. The vertices are organized into triangles. A single vertex may belong to more than one triangle. There are many ways of organizing the triangles. They may be stored independently or as part of a triangle fan or triangle strip.

Block 14 provides a 3-dimensional (3D) model of the active spacecraft, that is, the spacecraft doing the maneuvering, in the form of a vertex mesh. The target spacecraft is the origin of the reference frame.

Block 16 generates the 3D grid around the target spacecraft. This grid is fitted to the target in its body fixed frame. Since the spacecraft moves form node to node, the more nodes the mesh contains the more options the spacecraft has to maneuver. However, more nodes means more computation time. Consequently, we vary the density of the nodes based on the distance from the target. A minimum of three nodes is needed far from the target to allow the active spacecraft to circumnavigate the target. The grid, or node mesh, has more nodes near sharp obstacles or on the boundaries of the stayout zones and fewer in uncluttered regions.

Block 18 uses the A* algorithm to compute the optimal trajectory.

Block 20 provides the initial spacecraft position and velocity and the initial target position and velocity.

Block 22 sees if the trajectory is within the required tolerances of the final point computed in Block 18.

Block 24 stops the maneuver when the final waypoint computed in Block 18 is achieved.

Block 26 increments the trajectory. The trajectory generated in Block 18 is supplied a series of waypoints in position and velocity.

Block 28 is a source of processed measurements giving position and velocity relative to the target. The source of measurements may be optical sensors, radar, GPS or any other means. The raw measurements may be processed by a Kalman filter or other means.

Block 30 is the controller which commands thruster firings to reduce the error between the vehicle velocity and position and the desired velocity and position.

Block 32 determines if the error is too large to correct and that a new trajectory needs to be computed.

Block 34 fires thrusters to track the pre-computed trajectory.

Figure 2:
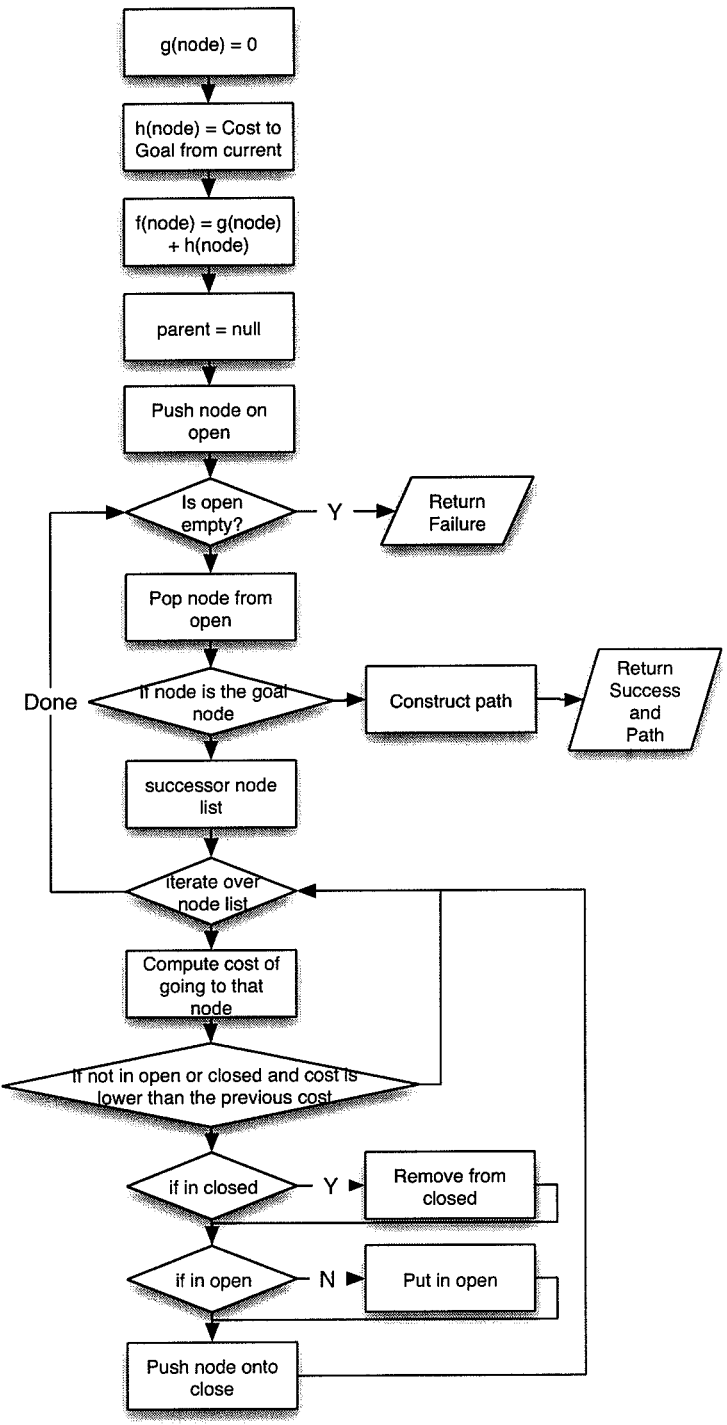
FIG. 2 shows a flow chart of the A* algorithm.

FIG. 2 is an exemplary flowchart of the A* algorithm.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of relative spacecraft maneuvering implemented aboard a maneuvering spacecraft that includes a computer device coupled with a camera capable of capturing video and still images, a memory on which are stored a plurality of three-dimensional models of target spacecraft and the maneuvering spacecraft, and a processor, the method comprising:

generating, by the processor, a maneuvering grid that comprises a plurality of maneuvering nodes around at least one three-dimensional model, the maneuvering nodes correspond to points in space through which the maneuvering spacecraft can safely traverse around each target spacecraft corresponding to the at least one three-dimensional model;

computing, by the processor, a trajectory for the maneuvering spacecraft comprising a plurality of waypoints, each of the plurality of waypoints is a maneuvering node, wherein the trajectory is computed to minimize the amount of fuel and the amount of time required to complete the trajectory;

firing, by the processor, one or more thrusters of the maneuvering spacecraft to move the maneuvering spacecraft toward a first waypoint according to the computed trajectory;

measuring, by the processor, the present position and velocity of the maneuvering spacecraft relative to the first waypoint by comparing images from the camera of each target spacecraft with the at least one three-dimensional model.

2. The maneuvering method according to claim 1, wherein the predetermined deviation from the computed trajectory is a maximum position deviation value and a maximum velocity deviation value, and both values are proportional to the actual distance between the maneuvering spacecraft and the target spacecraft.

3. The maneuvering method according to claim 2, wherein the maximum position deviation value is initially set to an operator defined value and declines to an operator defined tolerance and a maximum velocity deviation value is set to a second operator defined value and declines to a second operator defined tolerance.

4. The maneuvering method according to claim 1, wherein the target spacecraft is also maneuvering, and the computing and measuring adjust for the maneuvering of the target spacecraft.

5. The method of claim 1, wherein the trajectory of the maneuvering spacecraft is computed by determining a efficiently traversable path through the maneuvering grid using an A* algorithm.

6. The method of claim 5, wherein the efficiently traversable path is computed to ensure avoidance of the at least one target spacecraft.

7. The method of claim 1, further comprising:

comparing, by the processor, the measured position and velocity of the maneuvering spacecraft with the computed trajectory at the first waypoint;

on a condition that the maneuvering spacecraft is within a predetermined deviation from the first waypoint, repeating the firing, measuring and comparing to direct the maneuvering spacecraft to a second waypoint; and on a condition that the maneuvering spacecraft is not within a predetermined deviation from the first waypoint, repeating the computing, firing, measuring and comparing to direct the maneuvering spacecraft to the first waypoint.

8. A system for relative spacecraft maneuvering implemented aboard a maneuvering spacecraft, the system comprising:

one or more maneuvering thrusters on the maneuvering spacecraft;

a computer system operatively connected with the one or maneuvering thrusters and with the one or more position and velocity sensors, the computer system comprising at least one processor, at least one camera capable of capturing a video image and a plurality of still images, and a memory, the processor is configured to:

generate a maneuvering grid that comprises a plurality of maneuvering nodes around at least one three-dimensional model, the maneuvering nodes correspond to points in space through which the maneuvering spacecraft can safely traverse around each target spacecraft corresponding to the at least one three-dimensional model;

compute a trajectory for the maneuvering spacecraft comprising a plurality of waypoints, each of the plurality of waypoints is a maneuvering node, wherein the trajectory is computed to minimize the amount of fuel and the amount of time required to complete the trajectory firing one or more thrusters of the maneuvering spacecraft to move the maneuvering spacecraft toward a first waypoint according to the computed trajectory;

measure the present position and velocity of the maneuvering spacecraft relative to the first waypoint by comparing images from the camera with the at least one three-dimensional model of the at least one target spacecraft.

9. The system according to claim 8, wherein the predetermined deviation from the computed trajectory is a maximum position deviation value and a maximum velocity deviation value, and both values are proportional to the actual distance between the maneuvering spacecraft and the at least one target spacecraft.

10. The system according to claim 9, wherein the maximum position deviation value is initially set to an operator defined value and declines to an operator defined tolerance and a maximum velocity deviation value is set to a second operator defined value and declines to a second operator defined tolerance.

11. The system according to claim 8, wherein the at least one target spacecraft is also maneuvering, and the computing and measuring adjust for the maneuvering of the target spacecraft.

12. The system of claim 8, wherein the trajectory of the maneuvering spacecraft is computed by determining a efficiently traversable path through the maneuvering grid using an A* algorithm.

13. The system of claim 12, wherein the efficiently traversable path is computed to ensure avoidance of the at least one target spacecraft.

14. The system of claim 8, wherein the processor is further configured to:

compare the measured position and velocity of the maneuvering spacecraft with the computed trajectory at the first waypoint;

on a condition that the maneuvering spacecraft is within a predetermined deviation from the first waypoint, repeat the firing, measuring and comparing to direct the maneuvering spacecraft to a second waypoint; and on a condition that the maneuvering spacecraft is not within a predetermined deviation from the first waypoint, repeat the computing, firing, measuring and comparing to direct the maneuvering spacecraft to the first waypoint.

15. A method of relative spacecraft maneuvering implemented aboard a maneuvering spacecraft that includes a computer device coupled with a camera capable of capturing video and still images, a memory on which are stored one or more three-dimensional models of target spacecraft and the maneuvering spacecraft, and a processor, the method comprising:

generating, by the processor, a maneuvering grid that comprises a plurality of maneuvering nodes around one or more three-dimensional models, the maneuvering nodes correspond to points in space through which the maneuvering spacecraft can safely traverse around each target spacecraft corresponding to the one or more three-dimensional models;

computing, by the processor, a trajectory for the maneuvering spacecraft comprising a plurality of waypoints that avoid the one or more target spacecraft, each of the plurality of waypoints is a maneuvering node, wherein the trajectory is computed using an A* algorithm to minimize the amount of fuel and the amount of time required to complete the trajectory;

firing, by the processor, one or more thrusters of the maneuvering spacecraft to move the maneuvering spacecraft toward a first waypoint according to the computed trajectory;

measuring, by the processor, the present position and velocity of the maneuvering spacecraft relative to the first waypoint by comparing images from the camera with the one or more three-dimensional models of the one or more target spacecraft;

comparing, by the processor, the measured position and velocity of the maneuvering spacecraft with the computed trajectory at the first waypoint;

on a condition that the maneuvering spacecraft is within a predetermined deviation from the first waypoint, repeating the firing, measuring and comparing to direct the maneuvering spacecraft to a second waypoint; and on a condition that the maneuvering spacecraft is within a predetermined deviation from the first waypoint, repeating the computing, firing, measuring and comparing to direct the maneuvering spacecraft to the first waypoint.

* * * * *